United States Patent
Sun et al.

(10) Patent No.: US 9,363,706 B2
(45) Date of Patent: Jun. 7, 2016

(54) METHOD, DEVICE AND SYSTEM FOR SIGNAL TRANSMISSION

(71) Applicant: Huawei Technologies Co., Ltd., Shenzhen, Guangdong (CN)

(72) Inventors: Lixin Sun, Shenzhen (CN); Lei Wan, Shenzhen (CN); Lixia Xue, Shenzhen (CN); Xinrui Feng, Shenzhen (CN); Zheng Yu, Shenzhen (CN); Sha Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 16 days.

(21) Appl. No.: 13/671,283

(22) Filed: Nov. 7, 2012

(65) Prior Publication Data

US 2013/0064204 A1    Mar. 14, 2013

Related U.S. Application Data

(63) Continuation of application No. PCT/CN2011/073734, filed on May 6, 2011.

(30) Foreign Application Priority Data

May 7, 2010    (CN) .......................... 2010 1 0172893

(51) Int. Cl.
*H04W 28/04*    (2009.01)
*H04L 1/00*    (2006.01)
*H04W 48/08*    (2009.01)

(52) U.S. Cl.
CPC ........... *H04W 28/048* (2013.01); *H04L 1/0001* (2013.01); *H04L 1/0025* (2013.01);

(Continued)

(58) Field of Classification Search
USPC ......... 370/314, 319, 320, 329, 335, 337, 342, 370/344, 345, 347, 441
See application file for complete search history.

(56) References Cited

U.S. PATENT DOCUMENTS

| 5,245,629 A | 9/1993 | Hall |
| 2002/0181491 A1 | 12/2002 | Mircescu |

(Continued)

FOREIGN PATENT DOCUMENTS

| CN | 1409906 A | 4/2003 |
| CN | 101364832 A | 2/2009 |

(Continued)

OTHER PUBLICATIONS

Written Opinion of the International Searching Authority in corresponding PCT Patent Application No. PCT/CN2011/073734 (Aug. 11, 2011).

(Continued)

*Primary Examiner* — Edan Orgad
*Assistant Examiner* — Saumit Shah
(74) *Attorney, Agent, or Firm* — Leydig, Voit & Mayer, Ltd.

(57) ABSTRACT

A method, a device and a system for signal transmission are disclosed in embodiments of the present invention. The method comprises: selecting a multiplexing mode of signals to be transmitted by a cell according to interference strength received by the cell and/or interference strength received by a neighboring cell; notifying a receiver of the multiplexing mode of the signals to be transmitted by the cell; and transmitting the signals to be transmitted by the cell according to the multiplexing mode of the signals to be transmitted by the cell. Through the signal transmission method, device and system provided herein, the multiplexing mode is selected adaptively according to the interference strength. Therefore, the inter-cell interference is reduced, the reliability of channel detection is improved, the system complexity is reduced, and the cost is saved.

14 Claims, 6 Drawing Sheets

(52) U.S. Cl.
CPC ............... *H04Q2213/13098* (2013.01); *H04Q 2213/13109* (2013.01); *H04Q 2213/13292* (2013.01); *H04W 48/08* (2013.01)

(56) References Cited

U.S. PATENT DOCUMENTS

| | | |
|---|---|---|
| 2004/0141481 A1 | 7/2004 | Lee et al. |
| 2005/0018642 A1 | 1/2005 | Nakamura |
| 2009/0010228 A1* | 1/2009 | Wang et al. .................... 370/335 |
| 2009/0196245 A1* | 8/2009 | Ji ................................. 370/329 |
| 2010/0008230 A1* | 1/2010 | Khandekar et al. ........... 370/237 |
| 2011/0096745 A1* | 4/2011 | Ahn et al. ..................... 370/329 |

FOREIGN PATENT DOCUMENTS

| | | |
|---|---|---|
| EP | 1976155 A1 | 10/2008 |
| WO | WO 9965158 A1 | 12/1999 |

OTHER PUBLICATIONS

International Search Report in corresponding PCT Patent Application No. PCT/CN2011/073734 (Aug. 11, 2011).

1st Office Action in corresponding Chinese Patent Application No. 201010172893.X (Jun. 3, 2013).

Extended European Search Report in corresponding European Patent Application No. 11777175.8 (Apr. 17, 2013).

* cited by examiner

METHOD, DEVICE AND SYSTEM FOR SIGNAL TRANSMISSION

CROSS-REFERENCE TO RELATED APPLICATIONS

This application is a continuation of International Application No. PCT/CN2011/073734, filed on May 6, 2011 which claims priority to Chinese Patent Application No. 201010172893.X, filed on May 7, 2010, both of which are hereby incorporated by reference in their entireties.

FIELD OF TECHNOLOGY

The present invention relates to the field of communication technologies and, in particular, to a method, a device and a system for signal transmission.

BACKGROUND

To meet the performance requirements of the new generation of communication systems, low-power eNodeBs or transmitting/receiving nodes (for example, access points such as micro eNodeB, Pico eNodeB, Home eNodeB, Relay eNodeB, and RRH) may be deployed in the coverage scope of a macro eNodeB (Macro eNodeB) in a homogenous network (homogeneous network) system to enhance hotspot area coverage, indoor blind spot coverage, and cell edge coverage of the macro eNodeB in the coverage scope of the macro eNodeB, and enhance the average throughput of the cell, edge throughput of the cell, and uplink/downlink spectrum usage of the cell.

To improve the spectrum utilization efficiency of a system, the low-power eNodeB (or user equipment served by the low-power eNodeB) and the macro eNodeB (or user equipment served by the macro eNodeB) may perform (complete or partial) spectrum multiplexing. Because the low-power eNodeB (or user equipment served by the low-power eNodeB) and the macro eNodeB (or user equipment served by the macro eNodeB) share the same carrier resource, common-channel (or common-frequency) interference exists between the low-power eNodeB (or user equipment served by the low-power eNodeB) and the macro eNodeB (or user equipment served by the macro eNodeB). Interference may affect reliability of detection of the channels (including control channel and data channel) of the low-power eNodeB (or user equipment served by the low-power eNodeB) and the macro eNodeB (or user equipment served by the macro eNodeB). Currently, the inter-cell interference caused by the frequency multiplexing is reduced or eliminated primarily through a frequency domain mitigation method or a time domain mitigation method.

The inventor of the present invention found that, in the prior art, at the time of spectrum multiplexing, the inter-cell interference is large when the frequency domain mitigation method is applied, and the system complexity is high when the time domain mitigation method is applied.

SUMMARY

Embodiments of the present invention provide a method, a device and a system for signal transmission to reduce inter-cell interference and system complexity.

A signal transmission method provided in an embodiment of the present invention comprises:

selecting a multiplexing mode of signals to be transmitted by a cell according to interference strength received experienced by the cell and/or interference strength experienced by a neighboring cell;

notifying a receiver of the multiplexing mode of the signals to be transmitted by the cell; and transmitting the signals to be transmitted by the cell according to the multiplexing mode of the signals to be transmitted by the cell.

A signal transmission method provided in an embodiment of the present invention comprises:

obtaining a multiplexing mode of signals transmitted by a transmitter and to be transmitted by a cell; and receiving the signals to be transmitted by the cell according to the multiplexing mode of the signals to be transmitted by the cell.

A signal transmission device provided in an embodiment of the present invention comprises:

a selecting unit, configured to select a multiplexing mode of signals to be transmitted by a cell according to interference strength experienced by the cell and/or interference strength experienced by a neighboring cell;

a notifying unit, configured to notify a receiver of the multiplexing mode of the signals to be transmitted by the cell; and a transmission unit, configured to transmit the signals to be transmitted by the cell according to the multiplexing mode of the signals to be transmitted by the cell.

A signal transmission device provided in an embodiment of the present invention comprises:

an obtaining unit, configured to obtain a multiplexing mode of signals transmitted by a transmitter and to be transmitted by a cell; and a receiving unit, configured to receive the signals to be transmitted by the cell according to the multiplexing mode of the signals to be transmitted by the cell.

A signal transmission system provided in an embodiment of the present invention comprises:

a transmitter of the signal transmission device described above; and a receiver of the signal transmission device described above.

Through the signal transmission method, apparatus and system provided herein, the multiplexing mode is selected adaptively according to the interference strength. Therefore, the inter-cell interference is reduced, the reliability of channel detection is improved, the system complexity is reduced, and the cost is lowered.

BRIEF DESCRIPTION OF THE DRAWINGS

To illustrate the technical solutions according to embodiments of the present invention or in the prior art more clearly, the accompanying drawings required for describing the embodiments or the prior art are introduced below briefly. Apparently, the accompanying drawings in the following descriptions merely show some of the embodiments of the present invention, and persons of ordinary skill in the art can obtain other drawings according to the accompanying drawings without creative efforts.

DETAILED DESCRIPTION

Figure 1:
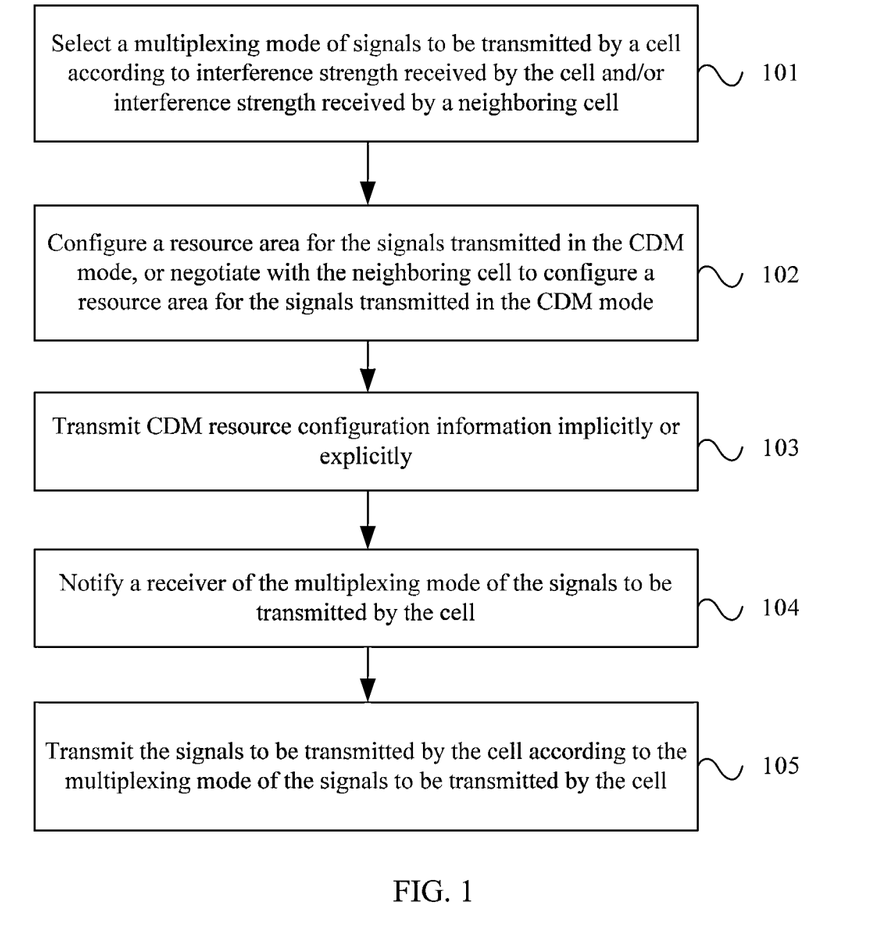
FIG. 1 is a schematic diagram of a signal transmission method according to an embodiment of the present invention.

FIG. 1 is a schematic diagram of a signal transmission method according to an embodiment of the present invention. The method in this embodiment comprises:

Step 101: Select a multiplexing mode of signals to be transmitted by a cell according to interference strength experienced by the cell and/or interference strength experienced by a neighboring cell.

Step 104: Notify a receiver of the multiplexing mode of the signals to be transmitted by the cell.

Step 105: Transmit the signals to be transmitted by the cell according to the multiplexing mode of the signals to be transmitted by the cell.

The entity for performing this embodiment is a transmitter, for example, an eNodeB, or macro eNodeB, or relay node, or Pico eNodeB, or home eNodeB, or user equipment (UE).

First, in step 101 in this embodiment, the transmitter selects a multiplexing mode of signals to be transmitted by the cell according to interference strength experienced by the cell and/or interference strength experienced by the neighboring cell. In this way, the multiplexing mode highly resistant against interference can be selected when the cell or the neighboring cell experiences strong interference, and a multiplexing mode less resistant against interference can be selected when the cell or the neighboring cell experiences weak interference. After the multiplexing mode is selected for the signals to be transmitted by the cell, the transmitter needs to notify the receiver of the selected multiplexing mode so that the receiver can use a correct multiplexing mode to receive the signals to be transmitted by the cell. Finally, the transmitter transmits the signals to the receiver in the selected multiplexing mode.

In this embodiment, the interference strength experienced by the cell may be the strength of interference on physical resource of the cell, which is measured by the transmitter or receiver in the cell based on pilot measurement, and/or the strength of the interference on the physical resource of the cell, which is reported by the receiver; in this embodiment, the physical resource of the cell, or the physical resource, may be time domain resources, or frequency domain resources, or a combination of the time domain resources and the frequency domain resources; the physical resource of the cell may be the physical resource occupied by the signal transmitted on a single downlink, and/or the physical resource occupied by the signal transmitted on a single uplink, and/or the physical resource occupied by the signal transmitted on multiple downlinks, and/or the physical resource occupied by the signal transmitted on multiple uplinks.

The cell determines the neighboring cell according to the measured neighboring cell signal, and/or information reported by the user equipment, and/or the network setting information; the neighboring cell may be a single cell, or a set of multiple cells; the interference strength experienced by the neighboring cell may be defined in a similar way as the interference strength experienced by the cell, and the definition is not detailed here any further. The information on the interference strength experienced by the cell or the neighboring cell, or the interference strength identifier information, may be transmitted or exchanged between the cell and the neighboring cell through an X2 interface or a wireless air interface.

The signals to be transmitted by the cell in this embodiment refer to signals to be transmitted in the coverage scope of the cell; the signals to be transmitted may be signals to be transmitted on a single downlink, and/or signals to be transmitted on a single uplink, and/or signals to be transmitted on multiple downlinks, and/or signals to be transmitted on multiple uplinks.

In this embodiment, the step of selecting a multiplexing mode of signals to be transmitted by the cell according to interference strength experienced by the cell and/or interference strength experienced by the neighboring cell may comprise:

If the interference strength experienced by the cell and/or the interference strength experienced by the neighboring cell is greater than or equal to a first threshold, a code division multiplexing (CDM) mode is selected for the signals to be transmitted by the cell; otherwise, a second multiplexing mode is selected for the signals to be transmitted by the cell. The second multiplexing mode is an orthogonal frequency division multiplexing (OFDM) mode, or a single carrier frequency division multiple access (SC-FDMA) mode, or a frequency division multiplexing (FDM) mode, or a time division multiplexing (TDM) mode. The first threshold may be determined according to the interference strength experienced by the cell and/or the interference strength experienced by the neighboring cell, and/or the transmission performance of signals transmitted by the cell, and/or required service type of the signals to be transmitted by the cell.

If the interference strength experienced by the cell and/or the interference strength experienced by the neighboring cell is greater than or equal to the first threshold, it is deemed that the interference strength is high, and the CDM mode highly resistant against interference is preferred; if the interference strength experienced by the cell and/or the interference strength experienced by the neighboring cell is less than the first threshold, it is deemed that the interference strength is low, and the second multiplexing mode less resistant against interference is preferred.

When a receiver UEa served by a transmitter a applies an SC-FDMA mode for the uplink PUSCH transmission, if detecting that the interference strength experienced by the uplink PUSCH transmission of UEa is greater than or equal to the first threshold, the transmitter a configures a CDM mode for the UEa to perform PUSCH transmission; if the strongly interfering signals experienced by the UEa in the PUSCH transmission previously performed in an SC-FDMA multiplexing mode are transmitted in a CDM mode, the transmitter a preferably configures a CDM mode for the UEa to perform PUSCH transmission on the physical resource of the highly interfering signal.

The method in this embodiment may further comprise the following steps:

Step 102: Configure a resource area for the signals transmitted in a CDM mode, or negotiate with the neighboring cell to configure a resource area for the signals transmitted in the CDM mode. The transmitter may configure a resource area for the signals transmitted in a CDM mode according to part or any combination of the following information:

configure a resource area for the signals transmitted in the CDM mode according to distribution of interference experienced by the cell, and/or transmission performance distribution of the cell, and/or load state of the cell; negotiate with the neighboring cell to configure a CDM resource area for the signals transmitted in the CDM mode according to distribution of interference experienced by the cell and the neighboring cell, and/or transmission performance distribution of the cell and the neighboring cell, and/or load state of the cell and the neighboring cell; configure a resource area for the signals transmitted in the CDM mode on the overlapping resources of the PUSCH resources of the cell and the PUCCH resources of the neighboring cell according to the PUCCH resource allocation information of the neighboring cell.

The overlapping resources of the PUSCH resources of the cell and the PUCCH resources of the neighboring cell refer to the overlap part of the PUSCH resource configuration of the cell and the PUCCH resource configuration of the neighboring cell.

The resource area may be determined according to the CDM resource configuration information. The CDM resource configuration information includes: size of the configured or negotiated physical resource and/or location of the physical resource. The size of the physical resource may include: number of the physical resource blocks and/or number of subcarriers. The location of the physical resource may include: location of the subcarrier, and/or location of the physical resource block, and/or subband location, and/or location of the subframe for transmitting the physical resource, and/or period of configuring the physical resource, and/or frequency hopping pattern of the physical resource.

Figure 2:
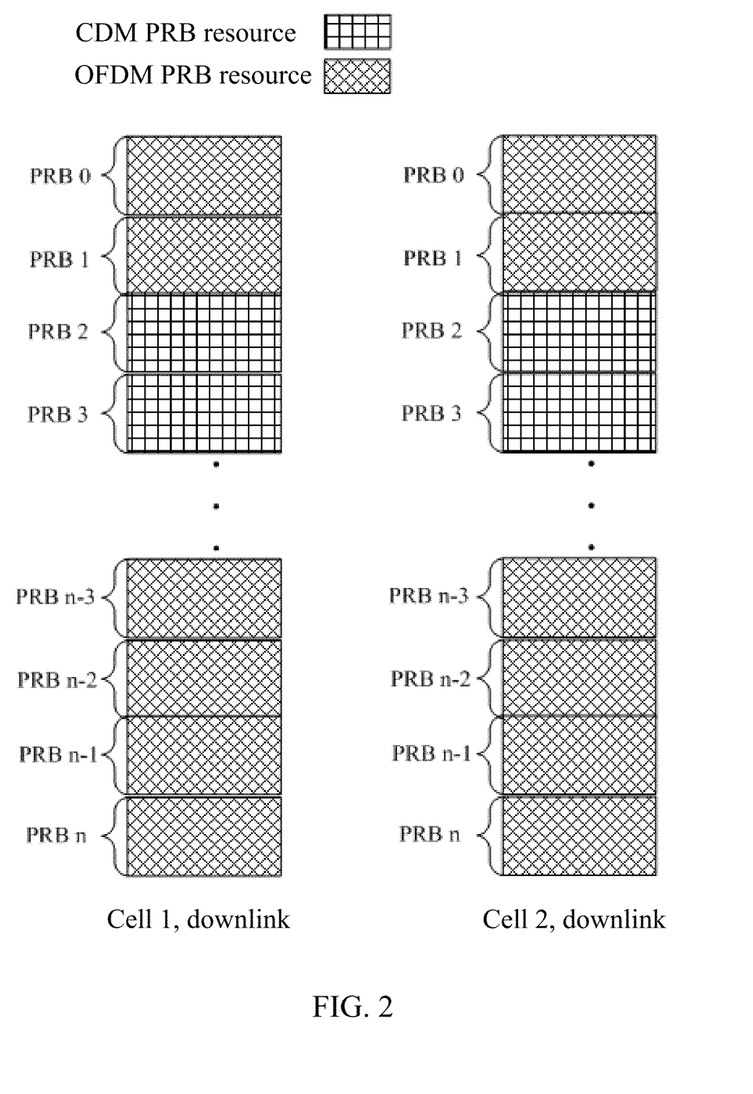
FIG. 2 is a schematic diagram of negotiation between a cell and a neighboring cell as regards how to configure a resource area for signals transmitted in a CDM mode.

FIG. 2 is a schematic diagram of negotiation between a cell (cell 1) and a neighboring cell (cell 2) as regards how to configure a resource area for signals transmitted in a CDM mode. As shown in FIG. 2, based on the distribution of interference experienced by the cell and the neighboring cell as well as the load state of the cell and the neighboring cell, the cell negotiates with the neighboring cell to configure physical resource block 2 (PRB2) and physical resource block 3 (PRB3) as the CDM resource area of the signals transmitted in the CDM mode; the transmitter transmits data in a CDM mode in the foregoing resource area. Correspondingly, if the receiver is invoked by data in the foregoing resource area, the receiver decodes the data in a CDM mode in the foregoing resource area.

Figure 3:
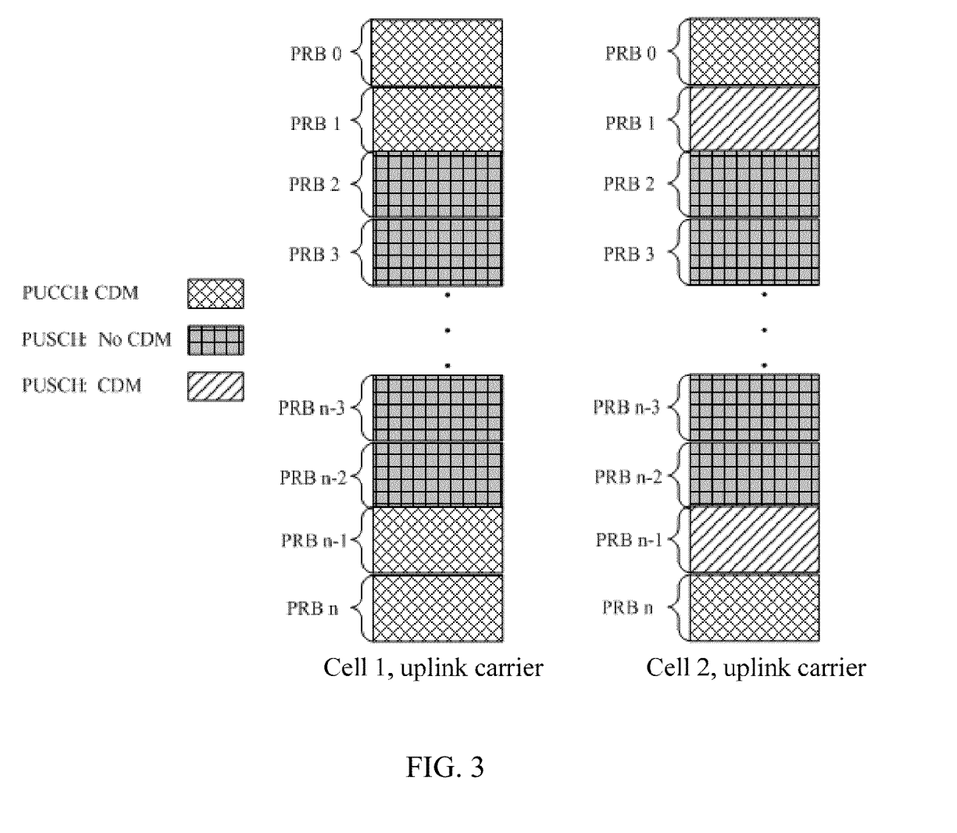
FIG. 3 is a schematic diagram of negotiation between a cell and a neighboring cell as regards how to configure another resource area for signals transmitted in a CDM mode.

FIG. 3 is a schematic diagram of negotiation between a cell and a neighboring cell as regards how to configure another resource area for signals transmitted in a CDM mode. As shown in FIG. 3, the cell (cell 2) and the neighboring cell (cell 1) negotiate to configure overlapping resources as a resource area of transmitting signals in a CDM mode, where the overlapping resources are an overlap between the PUSCH resources of the cell and the PUCCH resources of the neighboring cell. When the PUSCH performs transmission in a CDM mode on the overlapping resources, after spread spectrum modulation is performed for the uplink data through a CAZAC sequence whose length is 12, the uplink data is transmitted in a CDM mode on the same physical resource as the PUCCH format 2/2a/2b. Similarly, the spectrum spreading may be performed for the uplink data according to an uplink ACK/NACK time-frequency 2-dimensional spreading mode of the LTE system, and then the uplink data is transmitted in a CDM mode on the same physical resource as the PUCCH format 1/1a/1b.

The method in this embodiment may further comprise the following steps:

Step 103: Transmit CDM resource configuration information implicitly or explicitly.

The location of physical resource in the CDM resource configuration information and/or the size of the physical resource may be known to the transmitter and the receiver beforehand, or indicated by the transmitter explicitly through bits or fields. When the location of physical resource in the CDM resource configuration information and/or the size of the physical resource is indicated explicitly, bits or fields may indicate the location and/or size of the physical resource in a continuous resource allocation mode of the LTE system, or in a discontinuous resource allocation mode, or in a bitmap allocation mode.

If the transmitter and the receiver know the content of the CDM resource configuration information beforehand, the CDM resource configuration information may be transmitted implicitly. If the content of the CDM resource configuration information is indicated by the transmitter through bits or fields explicitly, the CDM resource configuration information may be transmitted in an explicit mode such as physical broadcast channel (PBCH), or dynamic broadcast channel (DBCH), or RRC dedicated signaling, or physical layer control channel. To save signaling overhead, when many signals of the cell need to be transmitted in the CDM mode, the transmitter may transmit the CDM resource configuration information through broadcast; when few signals of the cell need to be transmitted in the CDM mode, the transmitter may transmit the CDM resource configuration information through a dedicated signaling.

The method in this embodiment may further comprise the following steps:

Step 104: Notify the receiver of the multiplexing mode of the signals to be transmitted by the cell. The notification modes include:

Notifying, on a physical downlink control channel (PDCCH), the multiplexing mode of the signals to be transmitted by the cell; or notifying implicitly the multiplexing mode of the signals to be transmitted by the cell according to different scrambled codes of the cyclic redundancy check bits of the PDCCH or the information on the resource area of the signals to be transmitted by the cell; or, notifying over a radio resource control (RRC) signaling, the multiplexing mode of the signals to be transmitted by the cell; or, notifying, through an MCS field, the multiplexing mode of the signals to be transmitted by the cell.

For example, 1 bit may be added in the information over the PDCCH to indicate whether the CDM mode or the second multiplexing mode is applied to the PDSCH or PUSCH transmission. When the state of the added 1 bit is 0, it indicates that a CDM mode is applied to the PDSCH or PUSCH transmission; when the state of the added 1 bit is 1, it indicates that a second multiplexing mode is applied to the PDSCH or PUSCH transmission. Alternatively, a redundant field or redundant state in the information over the PDCCH is used to indicate whether a CDM mode or a second multiplexing mode is applied to the PDSCH or PUSCH transmission. For example, in an FDD system, redundant padding bits exist in the PDCCH designed for uplink scheduling. The padding bits may serve to indicate whether the CDM mode or the second multiplexing mode is applied to the PUSCH transmission.

Supposing that there is 1 padding bit, when the state of the padding bit is 0, it indicates that the CDM mode is applied to the PUSCH transmission, and, when the state of the padding bit is 1, it indicates that the second multiplexing mode is applied to the PUSCH transmission. In another example, it is stipulated that the hopping transmission of the PUSCH is disabled when discontinuous resource allocation is applied, and therefore, the hopping transmission indication bit (hopping bit) may serve to indicate whether the CDM mode or the second multiplexing mode is applied to the PUSCH transmission. In another example, if the information over the PDCCH includes a carrier index indicator (CIF, Carrier Index Indicator) field, the redundant state or the redundant bit of the CIF field may serve to indicate whether the CDM mode or the second multiplexing mode is applied to the PDSCH or PUSCH transmission. If the length of the CIF field is 3 bits, and the number of carriers in the carrier set configured by the transmitter for the receiver is less than or equal to 4, the 2 bits in the CIF are still used to indicate the carrier index, and the other 1 bit in the CIF is used to indicate whether the CDM mode or the second multiplexing mode is applied to the PDSCH or PUSCH transmission.

Alternatively, implicit information may be used to indicate whether the CDM mode or the second multiplexing mode is applied to the PDSCH or PUSCH transmission. For example, different scrambled codes of the cyclic redundancy check bits of the PDCCH are used to indicate whether the CDM mode or the second multiplexing mode is applied to the PDSCH or PUSCH transmission. For example, if the receiver uses scrambled code 1 to detect the physical downlink control channel correctly, the receiver believes that the CDM mode is applied to the PDSCH or PUSCH transmission; if the receiver uses scrambled code 2 to detect the physical downlink control channel correctly, the receiver believes that the second multiplexing mode is applied to the PDSCH or PUSCH transmission. In another example, the multiplexing mode of the signals to be transmitted by the cell may be notified implicitly according to the information on the resource area of the signals to be transmitted by the cell. For example, after the transmitter broadcasts the CDM resource configuration information, if the CDM resource area indicated in the broadcast CDM resource configuration information includes the PDSCH or PUSCH scheduling resources allocated by the transmitter to a specific receiver, the receiver believes that the CDM mode is applied to the PDSCH or PUSCH transmission.

Alternatively, a new information element (information element) may be added into an RRC dedicated signaling to indicate whether the CDM mode or the second multiplexing mode is applied to the PDSCH or PUSCH transmission.

Alternatively, certain states in a modulation and coding scheme (MCS) field may be used to indicate whether the CDM mode or the second multiplexing mode is applied to the PDSCH or PUSCH transmission. As shown in Table 1, when the index of the modulation and coding scheme (Imcs) belongs to the set {3, 8, 18, 19}, the field indicates that the CDM mode is applied. If the Imcs indicated in the MCS field in the PDCCH of the receiver belongs to the set {3, 8, 18, 19}, the receiver knows that the CDM mode is applied to the downlink PDSCH transmission or the uplink PUSCH transmission. It should be noted that the Imcs set for indicating the CDM mode above is illustrative only. In fact, the transmitter may configure any Imcs set for indicating the CDM mode applied to transmission.

TABLE 1

Using the MCS state to indicate the CDM mode

| MCS Index $I_{MCS}$ | Modulation Order $Q_m$ | TBS Index $I_{TBS}$ |
| --- | --- | --- |
| 0 | 2 | 0 |
| 1 | 2 | 1 |
| 2 | 2 | 2 |
| 3 | * | * |
| 4 | 2 | 4 |
| 5 | 2 | 5 |
| 6 | 2 | 6 |
| 7 | 2 | 7 |
| 8 | * | * |
| . | . | . |
| . | . | . |
| . | . | . |
| 18 | * | * |
| 19 | * | * |
| 20 | 6 | 18 |

The method in this embodiment may further comprise the following steps:

Step 106: Configure a spread spectrum code for the signals transmitted in the CDM mode, or negotiate with the neighboring cell to configure a spread spectrum code for the signals transmitted in the CDM mode, or negotiate with the neighboring cell to configure code resources for the signals transmitted in the CDM mode, where the code resources are available to the cell and the neighboring cell.

The code index here may be a code index of a spread spectrum code in a spread spectrum code set available to the transmitter, or a cyclic shift value of a specific spread spectrum sequence, or an index indicating a cyclic shift value of a specific spread spectrum sequence, or another index indicating the spread spectrum sequence. When CDM transmission is performed on the same physical resource, different spread spectrum codes or spread spectrum sequences are used to perform spread spectrum modulation for different data streams, and the receiver needs to know the code index used when the transmitter performs transmission in the CDM mode to the receiver, so that the receiver can perform correct data detection. According to the autocorrelation and cross-correlation features of the spread spectrum code, and also the code resources available to the cell and the interference strength experienced by the cell, the transmitter may decide the code length and code index used for the signals to be transmitted by the cell in the CDM mode. Considering the inter-cell interference coordination, the transmitter may negotiate with the neighboring cell to configure a spread spectrum code for the signals transmitted in the CDM mode, or negotiate with the neighboring cell to configure code resources for the signals transmitted in the CDM mode, where the code resources are available to the cell and the neighboring cells. In this way, the code used for the signals transmitted by the cell in the CDM mode is orthogonal to, or scarcely cross-correlated with, the code used for the signals transmitted by the neighboring cell in the CDM mode, and thus the inter-cell interference is suppressed.

Figure 4:
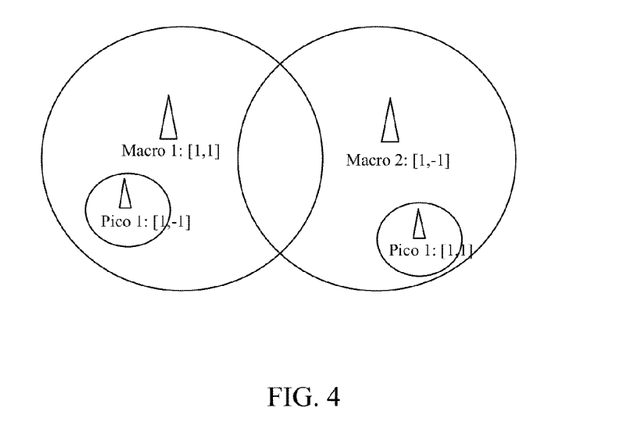
FIG. 4 is a schematic diagram of negotiation between two macro cells and the Pico cells covered in the two macro cells as regards how to configure available code resources for signals transmitted in a CDM mode.

FIG. 4 is a schematic diagram of negotiation between two macro cells and the Pico cells covered in the two macro cells as regards how to configure available code resources for signals transmitted in a CDM multiplexing mode. To reduce inter-cell interference, the code resources used by macro cell 1 may keep orthogonal (or quasi-orthogonal) to the code resources of the Pico cell under macro cell 2 and/or macro cell 1. The code resource coordination information is transmitted between different cells through an X2 interface or an air interface. The code resource coordination information includes configurable codes or code index set, and/or configured codes or code index set, and/or unconfigured code or code index set, and/or spread spectrum code length information, and/or spread spectrum code features that include information such as spread spectrum code type and base sequence of the spread spectrum code.

An RRC dedicated signaling or an information field in the PDCCH indicates a spread spectrum code index configured for the signals transmitted in a CDM mode. Alternatively, a new information element (information element) may be added into an RRC dedicated signaling to indicate the code index used when a CDM mode is applied to the downlink PDSCH or the uplink PUSCH transmission. For example, if spread spectrum modulation is performed for the uplink PUSCH data through a CAZAC sequence, and different receivers in one cell can perform CDM transmission on the same physical resource, the spread spectrum sequence of the different receivers is generated from the same CAZAC sequence according to different cyclic shifts. Therefore, in the RRC dedicated signaling, the transmitter may configure the code index used for uplink PUSCH CDM multiplexing for the receiver, or add a new field in the PDCCH to indicate the code index used for the uplink PUSCH CDM multiplexing.

The method in this embodiment may further comprise the following steps:

Step 107: Through the configured spread spectrum code index, determine a physical hybrid indication channel (PHICH) index corresponding to the physical uplink shared channel (PUSCH) that transmits signals in a CDM mode.

In the prior art, the PHICH channel index ($n_{PHICH}^{group}$, $n_{PHICH}^{seq}$) or ($n_{PHICH}^{seq}$, $n_{PHICH}^{group}$) is determined through the following formula:

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2 N_{SF}^{PHICH}$$

In the formula above, $n_{PHICH}^{group}$ is an index group number parameter, $n_{PHICH}^{seq}$ is an index sequence number parameter, $N_{SF}^{PHICH}$ is a spreading factor, $I_{PRB\_RA}^{lowest\_index}$ is the lowest marked index of the PRB occupied for transmitting the uplink data transmission block, $n_{DMRS}$ is the value of n-DMRS, $N_{PHICH}^{group}$ is the number of PHICH groups reserved for the current uplink carrier by the downlink carrier correlated with the current uplink carrier, $I_{PHICH}$ is set to 1 when the uplink and downlink subframe of the TDD system is set to 0 and the uplink data block is transmitted in the 5th or 10th subframe, and is set to 0 in other circumstances.

If different receivers in one cell perform CDM multiplexing on the same uplink physical resource, different receivers have the same $I_{PRB\_RA}^{lowest\_index}$. Therefore, the transmitter needs to set different n-DMRS values so that the PHICH index varies between the receivers performing the CDM multiplexing on the same resource. In fact, setting different n-DMRS values does not completely avoid conflict of the PHICH index. Therefore, to perform PHICH mapping more flexibly, as shown in the following formula, the index and cw of the configured CDM code may be introduced into the determining of the PHICH index.

$$n_{PHICH}^{group} = ((I_{PRB\_RA}^{lowest\_index} + cw) \bmod NPRB + n_{DMRS}) \bmod N_{PHICH}^{group} + I_{PHICH} N_{PHICH}^{group}$$

$$n_{PHICH}^{seq} = (\lfloor (I_{PRB\_RA}^{lowest\_index} + cw) \bmod NPRB / N_{PHICH}^{group} \rfloor + n_{DMRS}) \bmod 2 N_{SF}^{PHICH}$$

Here, cw is the index of the configured CDM code; and the NPRB is the total number of PRBs on the uplink carrier that carries the current uplink data block.

The step of transmitting the signals to be transmitted by the cell according to the multiplexing mode of the signals to be transmitted by the cell may include: the cell and the neighboring cell perform joint spectrum spreading according to the multiplexing mode of the signals to be transmitted by the cell to transmit the signals to be transmitted by the cell.

Figure 5:
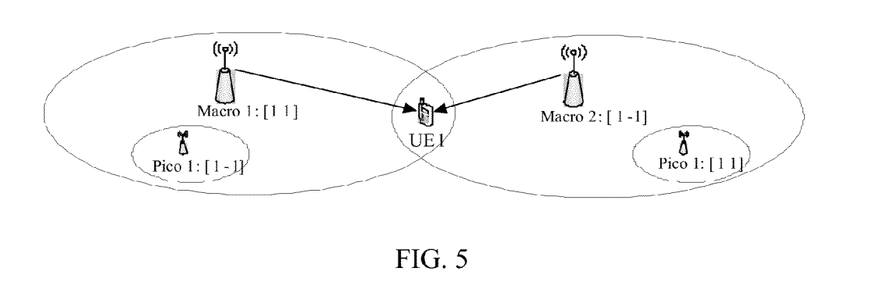
FIG. 5 is a schematic diagram of joint spread spectrum transmission performed by macro eNB1 and macro eNB2 for UE1 in a CDM mode to transmit signals to be transmitted by a cell.

To improve the transmission reliability of the signals on the receiver and improve the data transmission rate of the receiver, the cell and the neighboring cell may perform joint spread spectrum data transmission for the data of the same receiver. As shown in FIG. 5, macro eNB 1 (the cell) and macro eNB 2 (neighboring cell) perform spread spectrum data transmission for the data (signals to be transmitted by the cell) of UE 1 jointly. That is, macro eNB 1 and macro eNB 2 use different codes to spread spectrum for the same data stream of UE 1 respectively, and UE 1 receives data transmitted by macro eNB 1 and macro eNB 2 simultaneously to improve data transmission reliability. Nevertheless, macro eNB 1 and macro eNB 2 may use different codes to spread spectrum for different data streams of UE1 respectively, and UE1 receives the data transmitted by macro eNB 1 and macro eNB 2 simultaneously to improve data transmission efficiency.

Besides, the step of transmitting the signals to be transmitted by the cell according to the multiplexing mode of the signals to be transmitted by the cell may further include: performing data transmission in a CDM mode on a backhaul link. If the channel quality of the backhaul link is high, to boost the transmission capacity of the backhaul link, data may be transmitted in a CDM mode on the backhaul link. As regards how to indicate the CDM mode in the case of transmitting data in the CDM mode, how to determine the resource area when the CDM mode is applied, how to configure the code resource, and how to indicate the code index, the foregoing steps may serve as a reference.

Through the signal transmission method provided herein, the multiplexing mode is selected adaptively according to the interference strength. Therefore, the inter-cell interference is reduced, the reliability of channel detection is improved, the system complexity is reduced, and the cost is saved. Further, through a configuration step and a notification step, the process of the adaptive selection is more flexible. Through joint spread spectrum transmission, the data receiving reliability is improved, and the resource multiplexing efficiency is improved.

Figure 6:
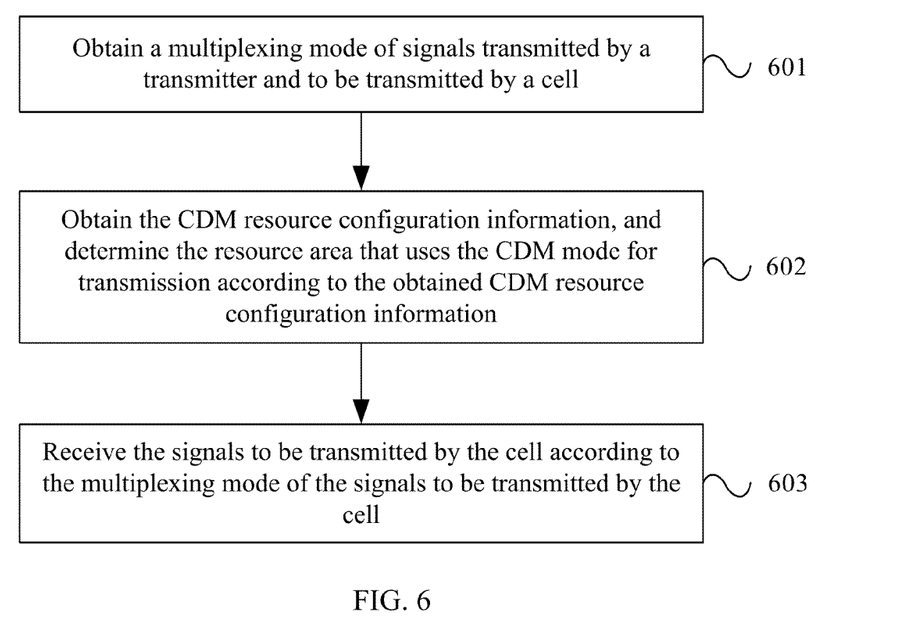
FIG. 6 is a schematic diagram of another signal transmission method according to an embodiment of the present invention.

FIG. 6 is a schematic diagram of another signal transmission method according to an embodiment of the present invention. The method in this embodiment comprises:

Step 601: Obtain a multiplexing mode of signals transmitted by a transmitter and to be transmitted by a cell.

Step 602: Receive the signals to be transmitted by the cell according to the multiplexing mode of the signals to be transmitted by the cell.

The entity for performing this embodiment is a receiver, for example, an eNodeB, or macro eNodeB, or relay node, or Pico eNodeB, or home eNodeB, or user equipment (UE). The receiver in this embodiment is designed to work together with the transmitter described in the embodiment shown in FIG. 1.

The receiver in this embodiment obtains a multiplexing mode of signals transmitted by a transmitter and to be transmitted by a cell first. In this way, as indicated, when the interference strength is high, a multiplexing mode strongly resistant against interference can be selected; when the interference strength is low, a multiplexing mode less resistant against interference can be selected. After the multiplexing mode is obtained, the receiver can receive the signals to be transmitted according to the multiplexing mode.

The mode of obtaining the multiplexing mode of the signals transmitted by the transmitter and to be transmitted by the cell may comprise:

receiving, on the physical downlink control channel (PDCCH), the multiplexing mode of the signals to be transmitted by the cell; or obtaining implicitly the multiplexing mode of the signals to be transmitted by the cell according to different scrambled codes of the cyclic redundancy check bits of the PDCCH or the information on the resource area of the signals to be transmitted by the cell; or receiving, over a radio resource control (RRC) signaling, the multiplexing mode of the signals to be transmitted by the cell; or obtaining, through an MCS field, the multiplexing mode of the signals to be transmitted by the cell.

The method in this embodiment may further comprise the following step:

Step 603: Obtain the CDM resource configuration information, and determine the resource area that uses the CDM mode for transmission according to the obtained CDM resource configuration information.

Through the signal transmission method provided herein, signals can be transmitted according to the multiplexing mode selected by the transmitter. Therefore, the inter-cell interference is reduced, the reliability of channel detection is improved, the system complexity is reduced, and the cost is saved.

Figure 7:
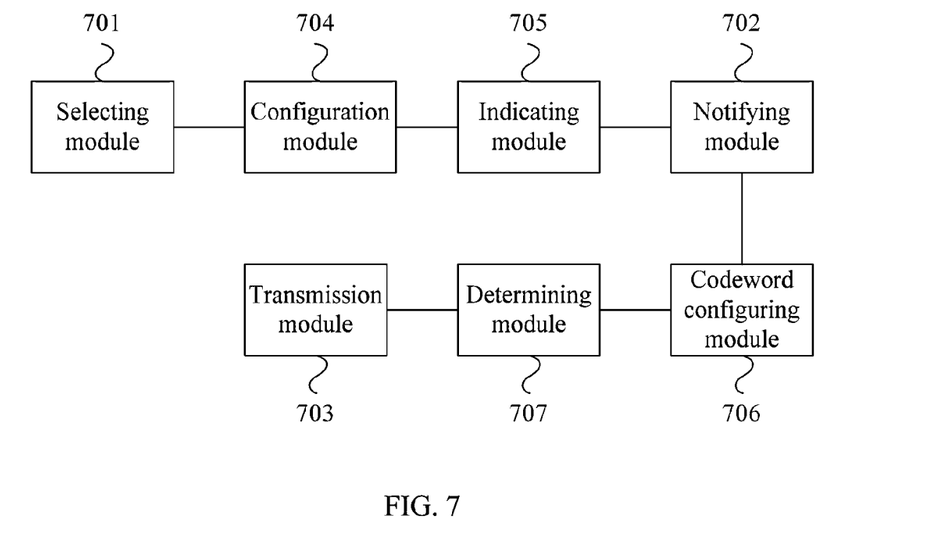
FIG. 7 is a schematic diagram of a signal transmission device according to an embodiment of the present invention.

FIG. 7 is a schematic diagram of a signal transmission device according to an embodiment of the present invention. The transmission device in this embodiment comprises:

a selecting module 701, configured to select a multiplexing mode of signals to be transmitted by a cell according to interference strength experienced by the cell and/or interference strength experienced by a neighboring cell;

a notifying module 702, configured to notify a receiver of the multiplexing mode of the signals to be transmitted by the cell; and a transmission module 703, configured to transmit the signals to be transmitted by the cell according to the multiplexing mode of the signals to be transmitted by the cell.

The transmission device in this embodiment is applicable to the method illustrated in FIG. 1, and is not repeated here any further.

The selecting module in this embodiment is configured to:

if the interference strength experienced by the cell and/or the interference strength experienced by the neighboring cell is greater than or equal to a first threshold, select a code division multiplexing (CDM) mode for the signals to be transmitted by the cell; otherwise, select a second multiplexing mode for the signals to be transmitted by the cell, where the second multiplexing mode is an orthogonal frequency division multiplexing (OFDM) mode, or a single carrier frequency division multiple access (SC-FDMA) mode, or a frequency division multiplexing (FDM) mode, or a time division multiplexing (TDM) mode.

The notifying module in this embodiment is configured to:

notify, on the physical downlink control channel (PDCCH), the multiplexing mode of the signals to be transmitted by the cell; or notify implicitly the multiplexing mode of the signals to be transmitted by the cell according to different scrambled codes of the cyclic redundancy check bits of the PDCCH or the information on the resource area of the signals to be transmitted by the cell; or notify, over a radio resource control (RRC) signaling, the multiplexing mode of the signals to be transmitted by the cell; or notify, through an MCS field, the multiplexing mode of the signals to be transmitted by the cell.

The transmission device in this embodiment may further comprise a configuration module 704, which is configured to set a resource area for the signals transmitted in a CDM mode, or negotiate with the neighboring cell to configure a resource area for the signals transmitted in the CDM mode.

The transmission device in this embodiment may further comprise an indicating module 705, which is configured to transmit CDM resource configuration information implicitly or explicitly.

The transmission device in this embodiment may further comprise a code configuring module 706, which is configured to set a spread spectrum code for the signals transmitted in the CDM mode, or negotiate with the neighboring cell to configure a spread spectrum code for the signals transmitted in the CDM mode, or negotiate with the neighboring cell to configure code resources for the signals transmitted in the CDM mode, where the code resources are available to the cell and the neighboring cell.

The transmission device in this embodiment may further comprise a determining module 707, which is configured to: through the configured spread spectrum code index, determine a physical hybrid indication channel (PHICH) index corresponding to the physical uplink shared channel (PUSCH) that transmits signals in a CDM mode.

The transmission module in this embodiment may be configured to:

transmit the signals to be transmitted by the cell by performing joint spectrum spreading according to the multiplexing mode of the signals to be transmitted by the cell.

Through the signal transmission device provided in this embodiment, the multiplexing mode is selected adaptively according to the interference strength. Therefore, the inter-cell interference is reduced, the reliability of channel detection is improved, the system complexity is reduced, and the cost is saved. Further, through a configuration module and an indicating module, the process of the adaptive selection is more flexible. Through joint spread spectrum transmission, the data receiving reliability is improved, and the resource multiplexing efficiency is improved.

Figure 8:
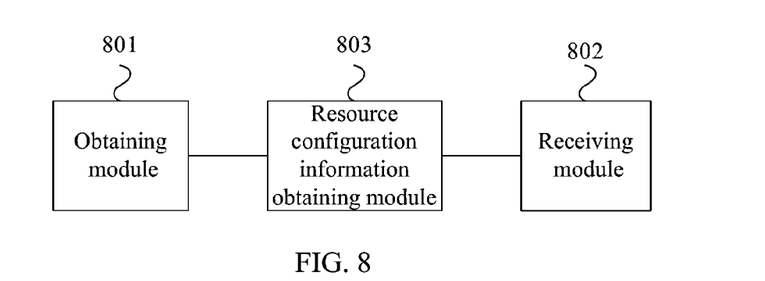
FIG. 8 is a schematic diagram of another signal transmission device according to an embodiment of the present invention.

FIG. 8 is a schematic diagram of another signal transmission device according to an embodiment of the present invention. The transmission device in this embodiment comprises:

an obtaining module 801, configured to obtain a multiplexing mode of signals transmitted by a transmitter and to be transmitted by a cell; and a receiving module 802, configured to receive the signals to be transmitted by the cell according to the multiplexing mode of the signals to be transmitted by the cell.

The transmission device in this embodiment is applicable to the method illustrated in FIG. 6, and is not detailed here any further.

The obtaining module in this embodiment is configured to:

receive, on the physical downlink control channel (PDCCH), the multiplexing mode of the signals to be transmitted by the cell; or obtain implicitly the multiplexing mode of the signals to be transmitted by the cell according to different scrambled codes of the cyclic redundancy check bits of the PDCCH or the information on the resource area of the signals to be transmitted by the cell; or receive, over a radio resource control (RRC) signaling, the multiplexing mode of the signals to be transmitted by the cell; or obtain, through an MCS field, the multiplexing mode of the signals to be transmitted by the cell.

The transmission device in this embodiment may further comprise:

a resource configuration information obtaining module 803, configured to obtain CDM resource configuration information, and determine the resource area that uses the CDM mode for transmission according to the obtained CDM resource configuration information.

Through the signal transmission device provided in this embodiment, signals can be transmitted according to the multiplexing mode selected by the transmitter. Therefore, the inter-cell interference is reduced, the reliability of channel detection is improved, the system complexity is reduced, and the cost is saved.

Figure 9:
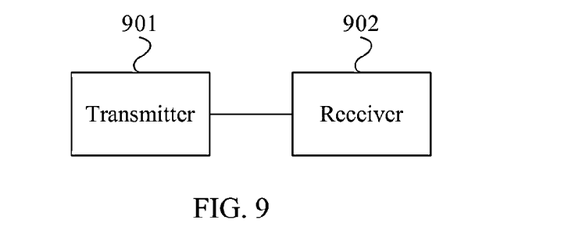
FIG. 9 is a schematic diagram of a signal transmission system according to an embodiment of the present invention.

FIG. 9 is a schematic diagram of a signal system according to an embodiment of the present invention. The system in this embodiment comprises:

a transmitter 901 described in the embodiment in FIG. 7; and a receiver 902 described in the embodiment in FIG. 8.

The signal transmission system in this embodiment is applicable to the methods illustrated in FIG. 1 and FIG. 5, and is not detailed here any further.

Through the signal transmission system provided in this embodiment, the multiplexing mode is selected adaptively according to the interference strength. Therefore, the inter-cell interference is reduced, the reliability of channel detection is improved, the system complexity is reduced, and the cost is saved.

Through the descriptions of the embodiments above, those skilled in the art can be clearly aware that the embodiments of the present invention may be implemented through hardware only, or through software in addition to necessary universal hardware, and often the later is preferred. Therefore, the essence of the technical solution of the present invention or its novel contribution to the prior art may be embodied in a software product. The software product is stored in computer-readable storage media such as computer floppy disk, hard disk and CD-ROM, and contains instructions for instructing a computer device (for example, personal computer, server, or network device) to execute the method specified in any embodiment of the present invention.

Detailed above are only exemplary embodiments of the present invention, but the scope of the present invention is not limited thereto. Any modification or substitution readily conceivable by those skilled in the art within the scope of the technology disclosed herein should fall within the scope of the present invention. Therefore, the scope of the present invention is subject to the appended claims.

What is claimed is:

1. A signal transmission method, comprising:
    selecting, by a transmitter of a cell according to at least a strength of interference experienced by a neighboring cell, a mode of multiplexing signals to be transmitted by the cell;
    notifying, by the transmitter, a receiver of the mode of multiplexing; and
    transmitting, by the transmitter, the signals according to the mode of multiplexing the signals;
    wherein, the interference experienced by the neighboring cell is the interference caused by at least one other cell on a physical resource of the neighboring cell measured by at least one of the transmitter and the receiver in the neighboring cell based on at least one of a pilot measurement, and the interference on the physical resource of the neighboring cell reported by the receiver;
    wherein, the method further comprises one or more of:
        configuring a resource area for the signals transmitted in a CDM mode or negotiating with the neighboring cell to configure the resource area for the signals transmitted in a CDM mode;
    wherein, the configuring the resource area for the signals transmitted in the CDM mode, further comprises:
        configuring, by the transmitter, the resource area for the signals transmitted in the CDM mode according to one or more of:
            distribution of interference on the cell,
            transmission performance distribution of the cell, and
            load state of the cell;
    the negotiating with the neighboring cell to configure the resource area for the signals transmitted in the CDM mode, comprising:
        negotiating, by the transmitter, with the neighboring cell to configure a CDM resource area for the signals transmitted in the CDM mode according to one or more of:
            distribution of interference experienced by the cell and interference experienced by the neighboring cell,
            transmission performance distribution of the cell and transmission performance distribution of the neighboring cell, and
            a load state of the cell and a load state of the neighboring cell.

2. The method according to claim 1, wherein:
    selecting the mode of multiplexing the signals to be transmitted by the cell comprises:
    if the strength of interference experienced by the cell and the strength of interference experienced by the neighboring cell is greater than or equal to a first threshold or if the strength of interference experienced by the neighboring cell is greater than or equal to the first threshold, selecting, by the transmitter, a code division multiplexing (CDM) mode as a first multiplexing mode;
    otherwise, selecting a second multiplexing mode, wherein the second multiplexing mode is one of the group consisting of an orthogonal frequency division multiplexing (OFDM) mode, a single carrier frequency division multiple access (SC-FDMA) mode, a frequency division multiplexing (FDM) mode, and a time division multiplexing (TDM) mode.

3. The method according to claim 1, wherein:
    notifying, by the transmitter, the receiver of the multiplexing mode comprises one of the group consisting of:
    notifying the receiver on a physical downlink control channel (PDCCH) of the multiplexing mode;
    implicitly notifying the receiver of the multiplexing mode according to different scrambled codes of cyclic redundancy check bits of the PDCCH or according to information on a resource area of the signals to be transmitted by the cell;
    notifying the receiver via radio resource control (RRC) signaling of the multiplexing mode; and
    notifying the receiver of the multiplexing mode through a modulation and coding scheme (MCS) field.

4. The method according to claim 1, further comprising one of the group consisting of:
    configuring, by the transmitter, spread spectrum codes for the signals transmitted in the CDM mode;

negotiating, by the transmitter, with the neighboring cell to configure spread spectrum codes for the signals transmitted in the CDM mode; and negotiating, by the transmitter, with the neighboring cell to configure code resources for the signals transmitted in the CDM mode, wherein the code resources are available to the cell and the neighboring cell.

5. The method according to claim 4, further comprising:

determining, by the transmitter through an index of the configured spread spectrum code, a physical hybrid indication channel (PHICH) index corresponding to a physical uplink shared channel (PUSCH) that transmits the signals in the CDM mode.

6. The method according to claim 1, wherein:

when a CDM mode is selected for transmitting the signals to be transmitted by the cell, transmitting the signals to be transmitted by the cell comprises:

performing, by the cell and the neighboring cell, joint spectrum spreading according to the CDM mode to transmit the signals to be transmitted by the cell.

7. A signal transmission device, wherein the device comprises a processor and a memory having processor-executable instructions stored therein, wherein the processor-executable instructions comprise instructions for:

selecting, according to at least a strength of interference experienced by a neighboring cell, a multiplexing mode of signals to be transmitted by a cell, and notifying a receiver of the multiplexing mode of the signals to be transmitted by the cell; and transmitting, by a transmitter, the signals to be transmitted by the cell according to the multiplexing mode of the signals to be transmitted by the cell;

wherein, the interference experienced by the neighboring cell is the interference caused by at least one other cell on a physical resource of the neighboring cell measured by at least one of the transmitter and the receiver in the neighboring cell based on at least one of a pilot measurement, and the interference on the physical resource of the neighboring cell reported by the receiver;

wherein, the instructions further comprise instructions for:

performing one of the group consisting of: configuring a resource area for the signals transmitted in a CDM mode, and negotiating with the neighboring cell to configure the resource area for the signals transmitted in a CDM mode;

wherein, the configuring the resource area for the signals transmitted in the CDM mode, comprising:

configuring the resource area for the signals transmitted in the CDM mode according to at least one of:

a distribution of interference experienced by the cell, a transmission performance distribution of the cell, and a load state of the cell;

the negotiating with the neighboring cell to configure the resource area for the signals transmitted in a CDM mode, comprising:

negotiating with the neighboring cell to configure a CDM resource area for the signals transmitted in the CDM mode according to at least one of:

a distribution of interference experienced by the cell and a distribution of interference experienced by the neighboring cell, a transmission performance distribution of the cell and a transmission performance distribution of the neighboring cell, and a load state of the cell and a load state of the neighboring cell.

8. The device according to claim 7, wherein the instructions further comprise instructions for:

selecting, if the interference strength experienced by the neighboring cell is greater than or equal to a first threshold, a code division multiplexing (CDM) mode as a first multiplexing mode; otherwise, selecting a second multiplexing mode, wherein the second multiplexing mode is one of the group consisting of: an orthogonal frequency division multiplexing (OFDM) mode, a single carrier frequency division multiple access (SC-FDMA) mode, a frequency division multiplexing (FDM) mode, and a time division multiplexing (TDM) mode.

9. The device according to claim 7, wherein the instructions further comprise instructions for performing at least one of the group consisting of:

notifying, on a physical downlink control channel (PDCCH), the receiver of the multiplexing mode of the signals to be transmitted by the cell;

implicitly notifying the receiver of the multiplexing mode of the signals to be transmitted by the cell according to different scrambled codes of cyclic redundancy check bits of the PDCCH or according to information on the resource area of the signals to be transmitted by the cell;

notifying, over a radio resource control (RRC) signaling, the receiver of the multiplexing mode of the signals to be transmitted by the cell; and notifying, through a modulation and coding scheme (MCS) field, the receiver of the multiplexing mode of the signals to be transmitted by the cell.

10. The device according to claim 7, wherein the instructions further comprise instructions for:

setting spread spectrum codes for signals transmitted in the CDM mode;

negotiating with the neighboring cell to configure the spread spectrum codes for signals transmitted in a CDM mode; or negotiating with the neighboring cell to configure code resources for signals transmitted in a CDM mode, wherein the code resources are available to the cell and the neighboring cell.

11. The device according to claim 10, wherein the instructions further comprise instructions for:

determining a physical hybrid indication channel (PHICH) index corresponding to a physical uplink shared channel (PUSCH) that transmits the signals in the CDM mode through an index of the configured spread spectrum code.

12. The device according to claim 7, wherein:

if a CDM mode is selected for transmitting the signals to be transmitted by the cell, the transmitter is configured to:

transmit the signals to be transmitted by the cell by performing joint spectrum spreading of the cell and the neighboring cell according to the CDM mode.

13. A signal transmission device, wherein the device comprises a processor and a memory having processor-executable instructions stored therein, the processor-executable instructions comprising instructions for:

obtaining a multiplexing mode of signals to be transmitted by a cell; and receiving the signals according to the multiplexing mode of the signals;

wherein the multiplexing mode of the signals to be transmitted by the cell is selected by the processor according to a strength of interference experienced by a neighboring cell; and wherein, the interference experienced by the neighboring cell is the interference caused by at least one other cell on a physical resource of the neighboring cell measured by at least one of a transmitter and a receiver in the neighboring cell based on at least one of a pilot measurement, and the interference on the physical resource of the neighboring cell reported by the receiver;

wherein, the signals received has been configured with a resource area for transmitting in a CDM mode, or configured with a resource area for transmitting in a CDM mode through negotiating with the neighboring cell;

wherein, the configuring of the resource area for transmitting the signals in the CDM mode, comprising:

the resource area for transmitting the signals in the CDM mode is configured according to at least one of:
- a distribution of interference experienced by the cell,
- a transmission performance distribution of the cell, and
- a load state of the cell;

the configuring of the resource area for transmitting the signals in the CDM mode through negotiating with the neighboring cell, comprising:

a CDM resource area for transmitting the signals in the CDM mode is configured through negotiating with the neighboring cell according to at least one of:
- a distribution of interference experienced by the cell and a distribution of interference experienced by the neighboring cell,
- a transmission performance distribution of the cell and a transmission performance distribution of the neighboring cell, and
- a load state of the cell and a load state of the neighboring cell.

14. The device according to claim 13, wherein the instructions further comprise instructions for:

receiving on a physical downlink control channel (PDCCH), the multiplexing mode of the signals to be transmitted by the cell;

implicitly obtaining the multiplexing mode of the signals according to different scrambled codes of cyclic redundancy check bits of the PDCCH or according to information on a resource area of the signals to be transmitted by the cell;

receiving, over a radio resource control (RRC) connection, the multiplexing mode of the signals; or obtaining, through a modulation and coding scheme (MCS) field, the multiplexing mode of the signals.

* * * * *